(12) United States Patent
Ohno

(10) Patent No.: US 6,230,583 B1
(45) Date of Patent: May 15, 2001

(54) BICYCLE PEDAL

(75) Inventor: Hiroaki Ohno, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/340,028

(22) Filed: Jun. 28, 1999

(51) Int. Cl.[7] .................................................. B62M 3/08
(52) U.S. Cl. ........................................................... 74/594.6
(58) Field of Search ............................... 74/594.6, 594.4; 36/131

(56) References Cited

U.S. PATENT DOCUMENTS

| | | | |
|---|---|---|---|
| 425,697 | * 4/1890 | Rankin | 74/594.6 |
| 535,065 | * 3/1895 | Lester | 74/594.6 |
| 644,512 | * 2/1900 | Halford | 74/594.6 |
| 4,686,867 | 8/1987 | Bernard et al. | 74/594.6 |
| 4,762,019 | 8/1988 | Beyl | 74/594.6 |
| 5,003,841 | 4/1991 | Nagano | 74/594.4 |
| 5,060,537 | 10/1991 | Nagano | 74/594.6 |
| 5,195,397 | * 3/1993 | Nagano | 74/594.4 |
| 5,203,229 | 4/1993 | Chen | 74/594.6 |
| 5,419,218 | 5/1995 | Romano | 74/594.6 |
| 5,497,680 | 3/1996 | Nagano | 74/594.6 |
| 5,692,415 | * 12/1997 | Lin | 74/594.6 |
| 5,802,930 | 9/1998 | Chen | 74/594.6 |
| 5,852,956 | * 12/1998 | Chen | 74/594.6 |
| 6,012,356 | * 1/2000 | Ueda | 74/594.6 |
| 6,085,614 | * 7/2000 | Lin | 74/594.6 |
| 6,105,462 | * 8/2000 | Ueda | 74/594.6 |

FOREIGN PATENT DOCUMENTS

| | | | |
|---|---|---|---|
| 163615 | * 12/1985 | (EP) | 74/594.6 |
| 619219A | 10/1994 | (EP) . | |

* cited by examiner

Primary Examiner—Rodney H Bonck
Assistant Examiner—Ha Ho
(74) Attorney, Agent, or Firm—Shinjyu Global IP Counselors, LLP

(57) ABSTRACT

A bicycle pedal assembly is provided attaching a shoe thereto via a cleat. The bicycle pedal has a pedal body rotatably coupled to the second end of the pedal shaft for supporting a cyclist's foot. The pedal body preferably has a pair of side portions, a tubular portion extending between the side portions and a pair of cleat engaging members pivotally coupled to the side portion. At least one spring is coupled between the pedal body and each of the cleat engaging members. The springs are mounted on pivot pins that extend between the side portions of the pedal body. The ends of the pivot pins are preferably located in unthreaded blind bores such that the pivot pins can freely rotate relative to the pedal body during movement of the cleat engaging members. One of the side portions of the pedal body is removably coupled to the remainder of the pedal body for easy assembly and disassembly of the pedal. In other words, to adjust the cleat engagement force of the cleat engaging members, the springs are replaced with weaker or stronger springs.

20 Claims, 4 Drawing Sheets

BICYCLE PEDAL

BACKGROUND OF THE INVENTION

1. Field of the Invention

This invention generally relates to a bicycle pedal. More specifically, the present invention relates to a clipless or step-in bicycle pedal having at least one spring biased cleat engaging member.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle. One component that has been extensively redesigned is the bicycle pedal.

In recent years, bicycle pedals have been designed for specific purposes such as for pleasure, off road biking, road racing, etc. One particular type of bicycle pedal, which is gaining more popularity, is the step-in or clipless pedal, which releasably engages a cleat secured to the sole of a cyclist's shoe. The clipless pedal has a pedal spindle that can be mounted on the crank of a bicycle, a pedal body that is rotatably supported on this pedal spindle, and a cleat engagement mechanism. In an off road bicycle pedal a cleat engagement mechanism is formed on both sides of the pedal body for engaging a cleat. Road racing pedals, on the other hand, typically only has a cleat engagement mechanism on one side of the pedal body. In either case, in this type of bicycle pedal, the rider steps onto the pedal and the cleat engagement mechanism automatically grips on to the cleat secured to the bottom of the cyclist's shoe.

When attaching the cyclist's shoe to the step-in or clipless pedal via the cleat, the cyclist moves the shoe obliquely downwardly and forwardly relative to the pedal body such that the front end of the cleat engages a front hook or clamping member of the pedal body. Once the front end of the cleat is engaged with the front hook of the pedal body, the cyclist places the rear end of the cleat in contact with a guide portion of the rear hook or clamping member of the pedal body. In this position, the cyclist presses the shoe downwardly against the pedal to cause the rear hook or clamping member to initially pivot rearwardly against the force of a spring to move the rear hook or clamping member to a cleat releasing position. The rear end of the cleat then enters a position opposite a back face of the rear hook or clamping member. Then, the rear hook or clamping member returns under the force of a biasing member or spring so that the rear hook or clamping member engages the rear end of the cleat. This engagement fixes the cyclist's shoe to the pedal via the cleat.

When releasing the shoe from the pedal, the cyclist will typically turn the shoe about an axis perpendicular or approximately perpendicular to the tread of the pedal, using the front end of the cleat as a pivoting point. As a result of this pivoting action, the rear hook or clamping member is pivoted rearwardly against the force of the spring to a cleat releasing position to release the shoe.

With this type of step-in or clipless pedal, the shoe and the pedal are in a state of constant engagement when the cleat clamping is engaged in the cleat clamping members, so the pedaling force can be transmitted efficiently to the pedals. As a result, step-in or clipless pedals are widely employed on racing bicycles used in road racing and mountain bike racing.

Furthermore, with off-road racing the foot must be repeatedly taken off the pedal during cornering and replaced on the pedal after the corner has been exited. Unfortunately, since the racing is performed on unpaved roads, mud clings to the pedals and tends to clog the clamping members. Once the clamping members become clogged with mud, the cleat cannot be engaged in the clamping members, and the shoe cannot be attached to the pedal. Moreover, the mud often clogs the biasing mechanism such that the clamping members may not operate properly.

When a cleat cannot be engaged with the cleat engagement members because of mud clogging, or when the feet are frequently removed from the pedals, the rider must often step on the pedal without the cleat being engaged in the cleat engagement members. Lower speed is a critical problem for a racer. Accordingly, when it is expected that the pedals will become clogged with mud or the shoes will be taken off and replaced on the pedals frequently in this type of off-road race, more and more riders are using ordinary double-sided pedals rather than clipless pedals. Such pedals have no cleat engagement members, but they provide a good grip to the shoes. However, in either case, the cyclist does not have an optimum apparatus for pedaling the bicycle.

In view of the above, there exists a need for a bicycle pedal relatively inexpensive to manufacture. This invention addresses these needs in the art, along with other needs, which will become apparent to those skilled in the art once given this disclosure.

SUMMARY OF THE INVENTION

One object of the present invention is to provide a step-in bicycle pedal that is relatively easy to assemble and disassemble.

Another object of the present invention is to provide a step-in bicycle pedal that is relatively inexpensive to manufacture.

Another object of the present invention is to provide a step-in bicycle pedal that is relatively malfunction free.

Another object of the present invention is to provide a step-in bicycle pedal that is relatively lightweight.

The foregoing objects of the present invention can be attained by providing a bicycle pedal for attaching a shoe thereto via a cleat. The bicycle pedal of the present invention basically has a pedal spindle, a pedal body, a first cleat engaging member, a second cleat engaging member and a first spring. The pedal spindle has a center longitudinal axis of rotation. The pedal body has a tubular portion rotatably coupled to the pedal spindle. The pedal body also has a first side portion coupled to a first end of the tubular portion and a second side portion removably coupled to a second end of the tubular portion. The first cleat engaging member is pivotally coupled to the first and second side portions of the pedal body by a first pivot pin. The second cleat engaging member is coupled to the pedal body and cooperates with the first cleat engaging member to fixedly couple the cleat thereto. The first spring has a first end portion engaging the pedal body, a coiled portion mounted on the first pivot pin and a second end portion engaging the first cleat engaging member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

Figure 1:
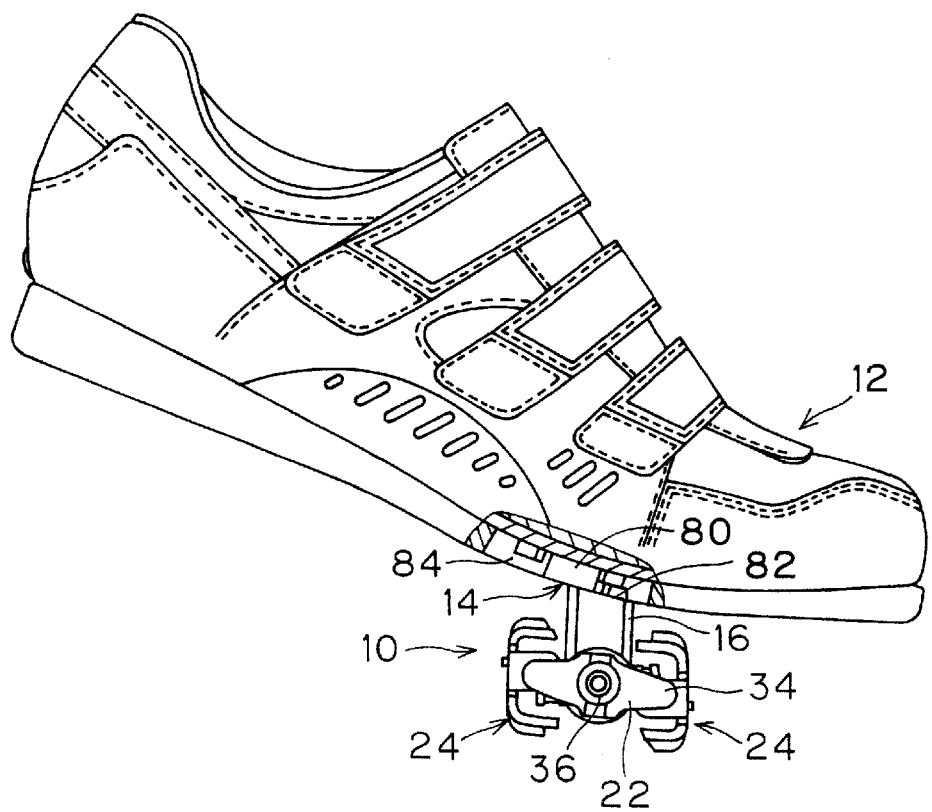
FIG. 1 is an outside elevational view of a bicycle shoe prior to being attached to a right bicycle pedal having a clipless pedal body in accordance with a first embodiment of the present invention.
Figure 2:
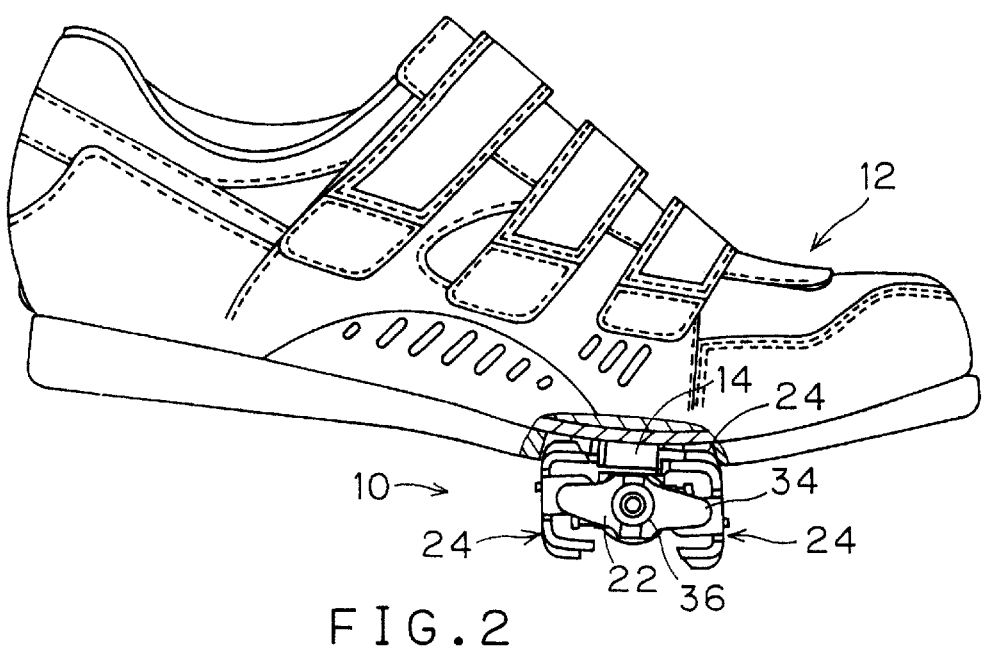
FIG. 2 is an outside elevational view of the right bicycle pedal illustrated in FIG. 1 after being attached to the cleat of the bicycle shoe.

Referring initially to FIGS. 1 and 2, a bicycle pedal 10 is illustrated in accordance with the first embodiment of the present invention. Bicycle pedal 10 is a clipless or step-in pedal that can be used with a bicycle shoe 12 having a cleat 14 fixedly coupled thereto. Bicycle pedal 10 is designed to be relatively easy to assemble and disassemble. Moreover, the bicycle pedal 10 is designed to be relatively inexpensive to manufacture. While the bicycle pedal 10 is especially designed for use with off-road bicycles as opposed to use with a road bicycle, it will be apparent from this disclosure that, the features of the bicycle pedal 10 can be used in the construction of a road type of bicycle pedal if needed and/or desired.

As seen in FIG. 1, the bicycle pedal 10 is fixedly coupled to bicycle crank arm 16 of a bicycle for rotation therewith. The bicycle pedal 10 illustrated in FIGS. 1 and 2 is a right side pedal, while the bicycle pedal 10 illustrated in FIGS. 3–8 is a left side pedal. Of course, the left side pedal 10 is the mirror image of the right side pedal 10. Thus, it will be apparent to those skilled in the art that the description of the right side pedal 10 applies to a left side pedal 10 and vice-a-versa. Moreover, the same reference numerals will be used identify the same parts in the right and left pedals.

Figure 3:
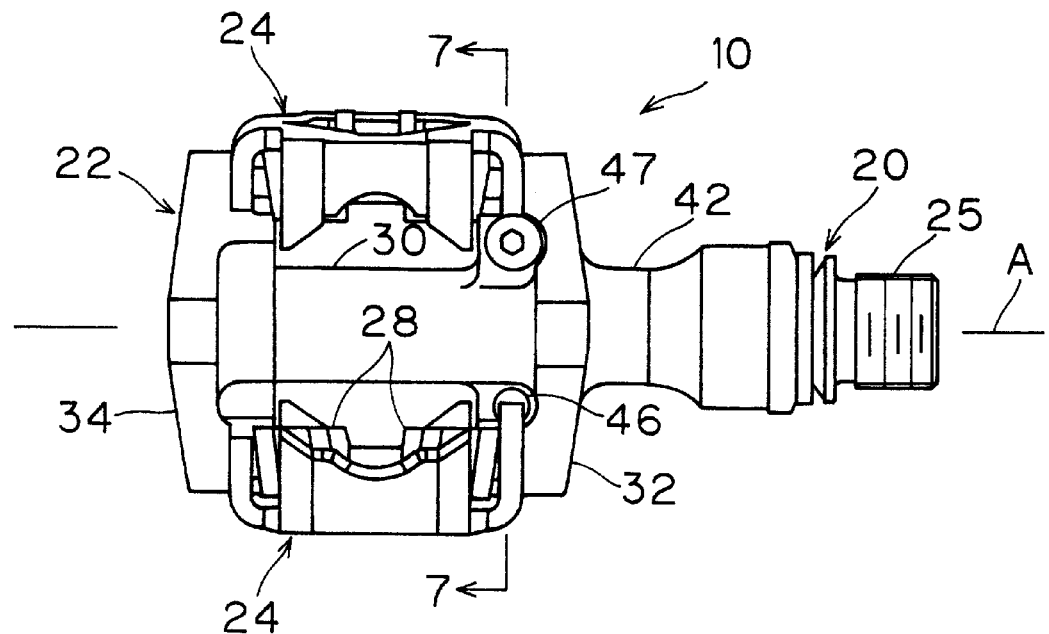
FIG. 3 is a top plan view of a left bicycle pedal in accordance with the present invention, which is the mirror image of the right bicycle pedal illustrated in FIGS. 1 and 2.
Figure 4:
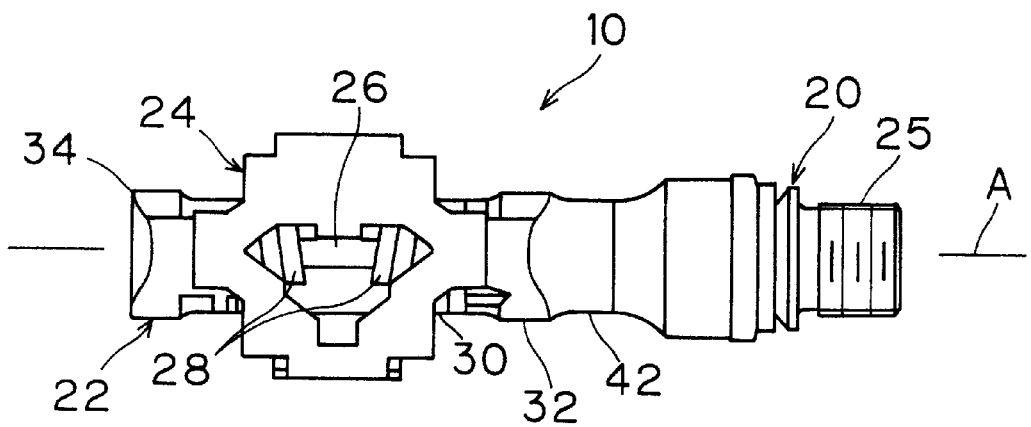
FIG. 4 is a rear end elevational view of the left bicycle pedal illustrated in FIG. 3.
Figure 8:
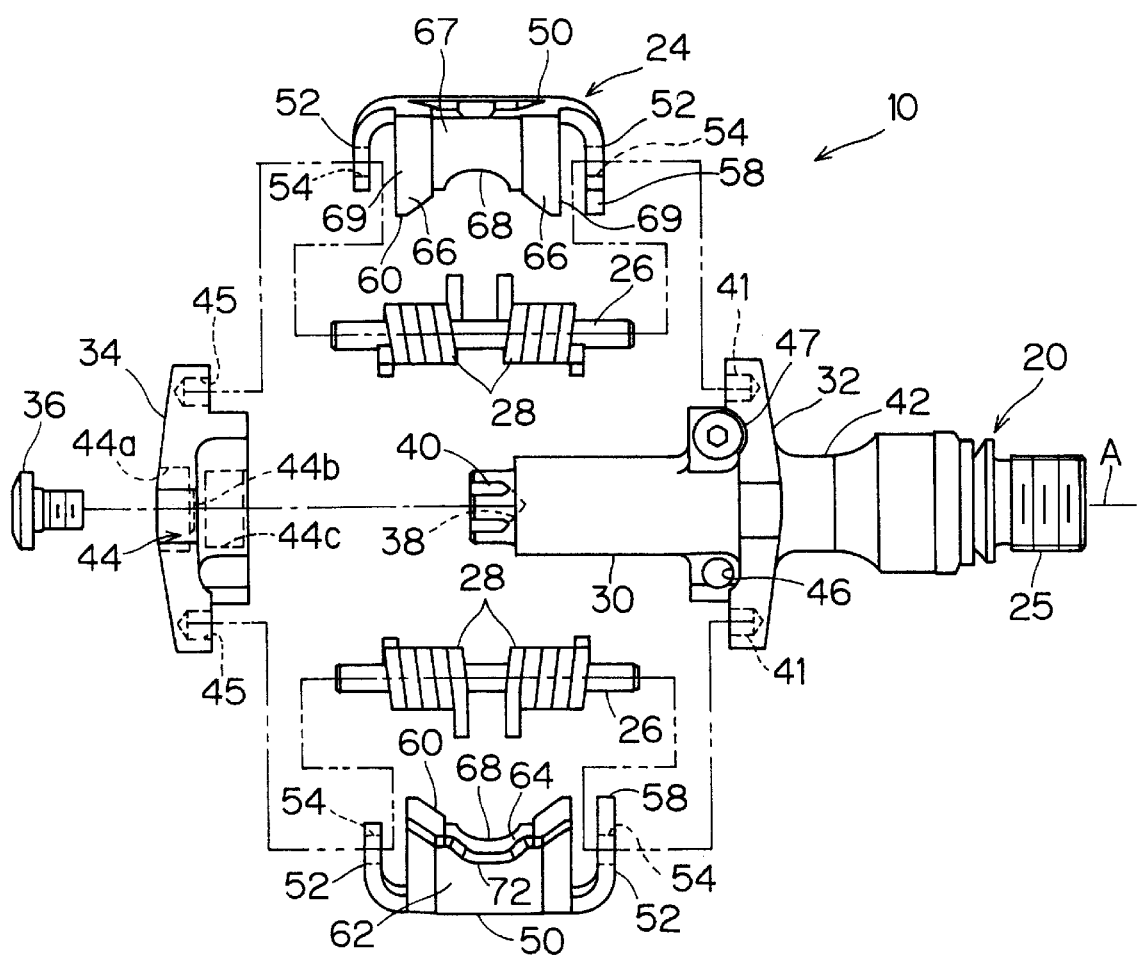
FIG. 8 is a top exploded plan view of the left bicycle pedal illustrated in FIGS. 3 through 7.

As seen in FIGS. 3, 4 and 8, the bicycle pedal 10 basically includes a pedal shaft or spindle 20 and a pedal body 22 with first and second cleat engaging members 24 coupled thereto. The spindle 20 is adapted to be coupled to crank arm 16, while the pedal body 22 is rotatably coupled to the spindle 20 for supporting a cyclist's foot. As shown in FIGS. 1 and 2, the pedal spindle 20 is fastened to crank arm 16 of a bicycle with the pedal body 22 being coupled together for rotation about a center longitudinal axis A of the pedal spindle 20. A cleat receiving area is formed on each side of the pedal body 22 for receiving and supporting the cleat 14 thereon. More specifically, cleat receiving area is defined between the cleat engaging members 24.

Pedal spindle 20 is preferably a multi-step spindle having several stepped portions that are rotatably coupled within the center tubular portion 30. Pedal spindle 20 has a first end 25 with threads formed thereon for fixedly coupling the pedal 10 to the crank 16 in a conventional manner. The inner end of the pedal spindle 20 rotatably supports the pedal body 22 about its longitudinal axis A by a conventional bearing assembly (not shown). In particular, spindle 20 is secured within the tubular portion 30 of pedal body 22 by an inner tube and a lock nut in a conventional manner. More specifically, the inner end of spindle 20 has threads formed thereon for threadedly receiving that lock nut that secures a bearing assembly to the outer tube. Since these parts are relatively conventional parts and the specific constructions of these parts are not critical to the present invention, they will not be discussed in detail herein. Rather, these parts will only be discussed as necessary to understand the present invention.

The first and second cleat engaging members 24 are pivotally coupled to the pedal body 22 by the pivot pins 26. Two springs 28 are coupled between the pedal body 22 and each of the cleat engaging members 24. Each cleat engaging member 24 together with its respective the pivot pin 26 and the springs 28 form a front cleat engagement mechanism on one side of the pedal body 22 and a rear cleat engagement mechanism on the opposite side of the pedal body 22. While two springs 28 are mounted on each the pivot pin 26, it will be apparent to those skilled in the art from this disclosure that fewer or more springs can be used. Accordingly, the term "biasing member" as used herein refers to one or more members that applies an urging force between two elements.

As seen in FIGS. 1 and 2, cleat 14 is fixedly attached to the bicycle shoe 12 in a conventional manner. The cleat 14 is releasably attached to the pedal body 22 via the cleat engaging members 24 in a conventional manner. In other words, the cleat 14 is designed to releasably couple the sole 18 of the shoe 12 to the bicycle pedal 10 by the first and second cleat engaging members 24. This type of pedal is often called a step-in or clipless pedal. Specifically, the cleat 14 is engaged with the pedal 10 by pressing the cleat 14 into the pedal 10 with a forward and downward motion. This releasably locks the cleat 14 to the pedal 10. The cleat 14 can be released from pedal 10 by twisting the heel of the shoe to the outside of the pedal 10 as discussed below in more detail.

Figure 7:
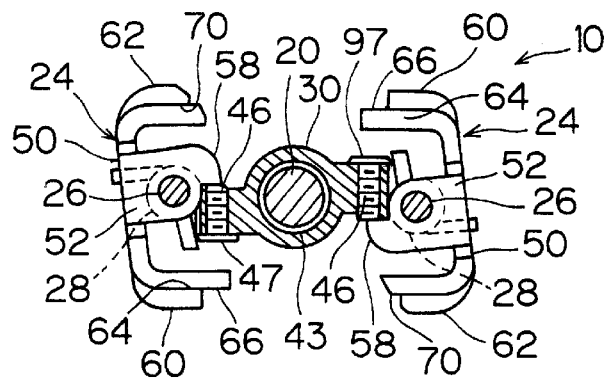
FIG. 7 is a transverse cross-sectional view of the left bicycle pedal illustrated in FIGS. 3 through 6 as seen along section line 7—7 of FIG. 3.

As shown in FIGS. 3, 7 and 8, the pedal body 22 has a center tubular portion 30, an inner or first side portion 32 and an outer or second side portion 34. Center tubular portion 30 received the pedal spindle 20 for rotation about center longitudinal axis A, while the side portions 32 and 34 pivotally support the cleat engaging members 24. The parts of the pedal body 22 are preferably made of a lightweight material such as an aluminum alloy. One of the cleat engaging members 24 is located at each end of pedal body 22. In particular, the pedal body 22 is an H-shaped member (see FIGS. 3 and 8). Pedal body 22 has a first end with one of the cleat engaging members 24 pivotally coupled thereto via one of the pivot pins 26, and a second end with the other of the cleat engaging member 24 pivotally coupled thereto via the other pivot pin 26.

The center tubular portion 30 is integrally formed with the first side portion 32 as a one-piece, unitary member. The second side portion 34, on the other hand is removably coupled to the center tubular portion 30 by a single threaded fastening member or screw 36. The screw 36 is threaded into a threaded bore 38 formed in the free end of center tubular portion 30. This construction results in the bicycle pedal 10 being relatively easy to assemble and disassemble. Moreover, this construction results in the bicycle pedal 10 being relatively inexpensive to manufacture, since no adjustment mechanism is utilized.

While a screw 36 is utilized to attach the second side portion 34 to center tubular portion 30, it will be apparent to those skilled in the art from this disclosure that other types of fastening members can be utilized. For example, a retaining clip (not shown) such as a C-shaped clip could be utilized to removably secure the second side portion 34 to the center tubular portion 30. In particular, the free end of the center tubular portion 30 can be provided with an annular groove for receiving the retaining clip therein. Also, the free end of the center tubular portion 30 would have to be modified to extend through an opening in the second side portion 34.

The second side portion 34 is also non-rotatably secured to the center tubular portion 30. In particular, the free end of the center tubular portion 30 has a stepped down portion with a non-circular outer surface that mates with corresponding noncircular portion of second side portion 34 as discussed below. Preferably, the free end of the center tubular portion 30 is provided with a plurality of recesses 40 that are equally spaced about the periphery of the free end of the center tubular portion 30.

The first side portion 32 is integrally formed with the center tubular portion 30. The first side portion 32 has a pair of unthreaded blind bores 41 formed at its ends for rotatably receiving pivot pins 26 therein. These blind bores 41 provide an attractive appearance, since the ends of pins 26 are not visible. Thus, a smooth outer surface can be formed. The first side surface 32 also has a tubular portion 42 extending outwardly therefrom in a direction opposite from the center tubular portion 30. A central bore 43 extends through the center tubular portion 30 and the side portion 32 for rotatably receiving the spindle 20 therein as seen in FIG. 7.

The second side portion 34 is provided with a center hole 44 for receiving threaded fastening member 36 therein. Preferably, this hole 44 has three sections as seen in FIG. 8. The first section 44a of the hole 44 is sized to receive the head of threaded fastening member 36 therein so as to recess the head of fastening member 36 from the outer surface of the second side portion 34. The second section 44b of this hole 44 is sized to receive the shaft portion of the threaded fastening member 36 therethrough. The third section 44c of the hole 44 is shaped to receive the free end of the center tubular portion 30 in a non-rotatable manner. In other words, this third section 44c of the hole 44 has a non-circular tubular inner surface that mates with the free end of the center tubular portion 30 in a non-rotatable fashion.

The second side portion 34 is also provided with a pair of unthreaded blind bores 45 for receiving the outer ends of the pivot pins 26. The blind bores 41 and 45 are unthreaded so that the pivot pins 26 can freely rotate therein. Thus, if mud should get clogged between the springs 28 and the pivot pins 26, the pivot pins 26 can freely rotate with the springs 28. This helps to prevent malfunctioning of the bicycle pedal 10 in muddy conditions. Also, the blind bores 45 provide an attractive appearance, since the ends of pins 26 are not visible. Thus, a smooth outer surface can be formed.

The side portions 32 and 34 extend forward and backward from the center tubular portion 30, and are located on opposite sides of the cleat engaging members 24. Pivot holes 41 and 45 are formed at each end of the side portions 32 and 34 for receiving the ends of the pivot pins 26 to pivotally couple cleat engaging members 24 thereto.

The first side portion 32 that is located on the inside of pedal body 22 has a threaded hole 46 formed on each of its upper and lower surfaces (see FIGS. 7 and 8). Threaded holes 46 are designed to attach a screw 47 as discussed below. The inner side portion 32 that is located on the inside of the pedal body 22 is integrally formed with center tubular portion 30 extending outwardly therefrom.

Figure 5:
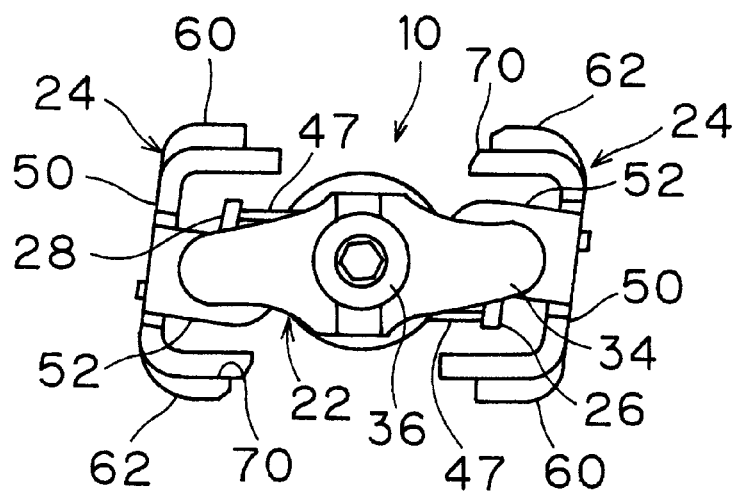
FIG. 5 is a left side elevational view of the left bicycle pedal illustrated in FIGS. 3 and 4.
Figure 6:
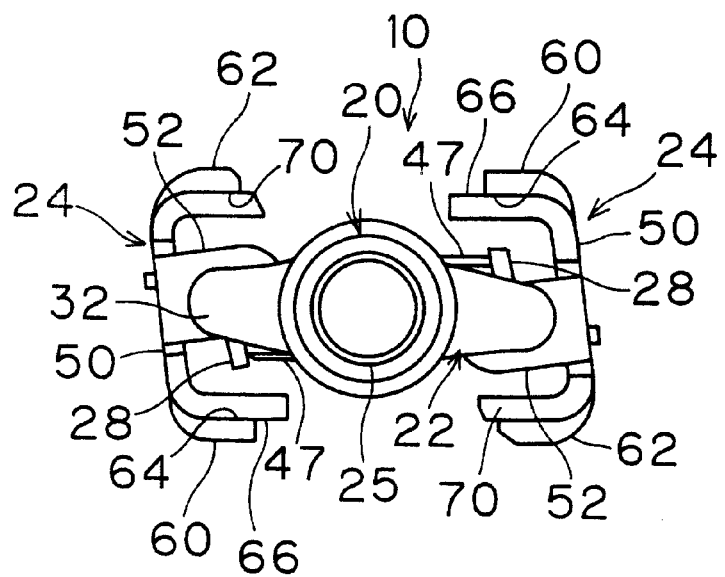
FIG. 6 is a right side elevational view of the left bicycle pedal illustrated in FIGS. 3 through 5.

Preferably, cleat engaging member 24 is identical as best seen in FIGS. 5–7. Cleat engaging members 24 selectively engage cleat 14 of bicycle shoe 12 to attach the sole of a bicycle shoe 12 to the pedal 10. Cleat engaging members 24 are pivotally coupled to the ends of the pedal body 22 by the pivot pins 26. Cleat engaging members 24 are curved in a roughly U-shaped configuration, with its two ends being pivotally supported by the pivot pins 26 (see FIGS. 7 and 8) that passes between the side portions 32 and 34 of the pedal body 22.

The torsion springs 28 have their mounting or coiled portions mounted on pivot pins 26, with one end of each spring engaging a part of pedal body 22 and the other end of each spring engaging one of the cleat engaging members 24. Springs 28 normally urge the cleat engaging members 24 to rotate about their respective the pivot pins 26 from their cleat releasing positions to their cleat engaging or clamping positions. In other words, the springs 28 normally maintain the cleat engaging members 24 in cleat engaging positions. The retaining forces of the springs 28 on the cleat engaging members 24 are controlled by changing the springs 28 with either weaker or stronger springs. Of course, the shape and the construction of the cleat engaging members 24 can be modified to change the cleat retaining force. Thus, cleat engaging members 24 and/or springs 28 can be easily exchanged to control the cleat retaining force of the pedal 10 or to replace a damaged part. In other words, the construction of the bicycle pedal 10 allows for quick and easy replacement of the cleat engaging members 24 and/or springs 28 to control the cleat retaining force of the bicycle pedal 10 or replace a damaged part. Accordingly, the pedal 10 can be sold with additional springs and/or cleat engaging members that can be exchanged for controlling the cleat retaining force of the bicycle pedal 10. Such additional springs would be substantially identical but have different spring retaining forces.

Pedal 10 is also provided with a pair of adjustment members or screws 47. The adjustment members or screws 47 initially place the springs 28 under tension. Specifically, when the cleat engaging members 24 and springs 28 are coupled to the pedal body 22 by the pivot pins 26, the springs 28 are normally not under tension. Adjustment member or screws 47 are threaded into threaded holes 46 formed in the pedal body 22 such that the free ends of the screws 47 contact a portion of the associated cleat engaging member 24 to rotate the cleat engaging member 24. The associated springs 28 are now placed under tension. This arrangement allows for easy assembly of the bicycle pedal 10, since cleat engaging members 24 and the springs 28 can be coupled to the pedal body 22 without placing the springs 28 under tension. Also, this arrangement allows the initial tension to be regulated by utilizing thin washers between the head of the screws 47 and the pedal body 22.

Referring now to FIGS. 7 and 8, each of the cleat engaging members 24 includes a connecting portion 50 with a pair of legs 52 extending downwardly from the connecting portion 50 for coupling cleat engaging member 24 to the pedal body 22 via pivot pins 26. More specifically, each of the legs 52 of cleat engaging members 24 has a mounting hole 54 formed therein for receiving an end of one of the pivot pins 26 therein. Accordingly, each of the cleat engaging members 24 is pivotally mounted about its respective pivot pin 26 for movement between a cleat clamping position and a cleat releasing position. One of the legs 52 of each cleat engaging member 24 also has a stop portion or flange 58 which engages one of the screws 47 of the pedal body 22 to limit rotational movement of the respective cleat engaging member 24 via the springs 28.

Each of the cleat engaging members 24 has a front cleat engagement portion 60 and a rear cleat engagement portion 62. Front cleat engagement portion 60 extends from one side of connecting portion 50, while rear cleat engagement portion 62 extends from the other side of connecting portion 50. Front cleat engagement portion 60 engages the front portion of cleat 14, while a rear cleat engagement portion 62 engages the rear portion of cleat 14. Each front cleat engagement portion 60 of each of cleat engaging members 24 has a first cleat engagement surface 64 facing in a first direction and a second cleat engagement surface 66 facing in a second direction which is substantially opposite to the first direction. The functions and operations of cleat engaging members 24 are well known in the art, and thus will only be briefly discussed herein. Moreover, it will be apparent to those skilled in the art that most any step-in type of cleat engagement mechanism can be used with the present invention. In other words, other types of cleat engaging members can be used so long as they do not depart from the spirit of the present invention.

First cleat engagement surface 64 is formed on the inner surface of a raised center flange 67, which has a curved stop surface 68 for engaging cleat 14 to limit longitudinal movement of cleat 14 relative to pedal body 22. Curved stop surface 68 extends substantially perpendicular to first cleat engagement surface 64. Second cleat engagement surface 66 is formed by a pair of side flanges or sections 69, which are located on opposite sides of the raised center flange 67. In other words, second cleat engagement surface 66 has two spaced apart sections with first cleat engagement surface 64 located between spaced apart sections formed by side flanges or sections 69 of second cleat engagement surface 66. Side flanges or sections 69 of second cleat engagement surface 66 are located closer to tubular portion 30 of pedal body 22 than first cleat engagement surface 64. Accordingly, a gap is formed between the tubular portion 30 of the pedal body 22 and the first cleat engagement surface 64. In other word, the side flanges or sections 69 of second cleat engagement surface 66 are located closer to the tubular portion 30 of the pedal body 22 than first cleat engagement surface 64.

First and second cleat engagement surfaces 64 and 66 preferably lie in substantially the same plane, but face in opposite directions. More specifically, the first cleat engagement surface 64 faces downwardly away from the sole 18 of the shoe 12, while the second cleat engagement surface 66 faces upwardly toward the sole 18 of shoe 12. Thus, the first and second cleat engagement surfaces 64 and 66 hold the cleat 14 about the tubular portion 30 of the pedal body 22.

As best seen in FIGS. 5–8, the rear cleat engagement portion 62 has a downwardly facing the cleat engagement surface 70, which faces in substantially the same direction as the first cleat engagement surface 64 of the front cleat engagement portion 60 of the other cleat engaging member 24. A curved stop surface 72 is also formed on rear cleat engagement portion 62 for engaging the cleat 14 to limit its longitudinal movement relative to the pedal body 22, as explained below. The curved stop surface 72 extends substantially perpendicular to the cleat engagement surface 70.

A cleat receiving area is formed on each side of the pedal body 22 for receiving and supporting the cleat 14 thereon. More specifically, the cleat receiving area is defined by the space located between the front and rear cleat engagement portions 60 and 62 in which the cleat 14 is received. The front and rear cleat engagement portions 60 and 62 engage the cleat 14 to releasably couple the sole 18 of shoe 12 to bicycle pedal 10. Specifically, cleat 14 is engaged with the pedal 10 by pressing cleat 14 into pedal 10 with a forward and downward motion. This releasably locks cleat 14 to pedal 10. Cleat 14 can be released from the pedal 10 by twisting the heel of the shoe to the outside of the pedal 10 as discussed below in more detail.

Referring again to FIG. 1, bicycle shoe cleat 14 basically includes a center attachment portion 80, a first or front coupling portion 82 extending from one end of attachment portion 80 and a second or rear coupling portion 84 extending from the other end of the attachment portion 80. Attachment portion 80 has an upper sole side facing in a first direction for engaging the sole 18 of the shoe 12 and a lower pedal side facing in a second direction which is substantially opposite to said first direction. Preferably, the attachment portion 80 and the coupling portions 82 and 84 are integrally formed together as a one-piece, unitary member, which is constructed from a suitable rigid material. The interconnection of the cleat 14 to the sole is relatively well known in the art, and thus, this interconnection will not be discussed or illustrated in detail herein.

Operation of the pedal 10 will now be briefly described with reference to FIGS. 1, 2, and 5. When the bicycle shoe 12 is to be attached to the pedal 10, the tip of the shoe is moved forward towards one of the front cleat engagement portions 60 so that the tip of cleat 14 is inserted into one of the cleat engaging members 24 (see FIG. 2).

Once the tip or coupling portion 82 of the cleat 4 has been inserted into one of the front cleat engagement portion 60, a force is applied to the heel side of the shoe 12, such that the shoe 12 is pushed down toward the pedal 10. When the heel is pressed down further from this state, the rear end of the cleat 14 rotates the rear cleat engagement portion 62 backward against the biasing force of the springs 28. Cleat 14 then slides between the two cleat engagement portions 60 and 62. Once the cleat 14 has slid between the two cleat engagement portions 60 and 62, the rear cleat engagement portion 62 is biased by the springs 28 back to its original position. Rotation of the rear cleat engagement portion 62 is stopped by flange 58 engaging one of the screws 47 in the side portions 32 of the pedal body 22. As a result, cleat 14 is engaged between the two cleat engagement portions 60 and 62 of the cleat engaging members 24 (see FIGS. 1 and 5).

When the shoe 12 is to be removed from the pedal 10, the heel portion of the shoe 12 is lightly twisted to the outside. This twisting motion will cause the rear cleat engagement portion 62 to rotate against the energizing force of the springs 28, and the engagement of the rear end of the cleat 14 will be released instantly.

While only one embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle pedal adapted to be attached to a cleat that is fixed to a bicycle shoe, comprising:
   a pedal spindle having a center longitudinal axis of rotation;
   a pedal body having a tubular portion rotatably coupled to said pedal spindle, a first side portion coupled to a first end of said tubular portion and a second side portion selectively removably coupled to a second end of said tubular portion;

a first cleat engaging member pivotally coupled to said first and second side portions of said pedal body by a first pivot pin;

a second cleat engaging member coupled to said pedal body and cooperating with said first cleat engaging member to fixedly couple the cleat thereto; and a first biasing member having a first end portion engaging said pedal body, a mounting portion mounted on said first pivot pin and a second end portion engaging said first cleat engaging member.

2. A bicycle pedal according to claim 1, wherein a single fastening member removably couples said second side portion to said tubular portion.

3. A bicycle pedal according to claim 1, wherein said second cleat engaging member is pivotally coupled to said first and second side portions of said pedal body by a second pivot pin.

4. A bicycle pedal according to claim 3, further comprising a second biasing member having a first end portion engaging said pedal body, a mounting portion mounted on said second pivot pin, and a second end portion engaging said second cleat engaging member.

5. A bicycle pedal according to claim 4, wherein said first and second cleat engaging members are substantially identical.

6. A bicycle pedal according to claim 4, wherein said first biasing member includes at least two first springs that are coupled to said pedal body by said first pivot pin, and said second biasing member includes at least two second springs that are coupled to said pedal body by said second pivot pin.

7. A bicycle pedal according to claim 4, wherein said second end of said tubular portion has a non-circular outer surface, and said second side portion has a non-circular bore mating with said second end of said tubular portion.

8. A bicycle pedal according to claim 4, wherein each of said first and second side portions has a first blind bore that rotatably receives one end of said first pivot pin, and each of said first and second side portions has a second blind bore that rotatably receives one end of said second pivot pin.

9. A bicycle pedal according to claim 4, wherein a single fastening member removably couples said second side portion to said tubular portion.

10. A bicycle pedal according to claim 9, wherein said single fastening member is a threaded bolt that passes through an opening in said second side portion and is threaded into a bore formed in said second end of said tubular portion.

11. A bicycle pedal according to claim 10, wherein said second end of said tubular portion has a non-circular outer surface, and said second side portion has a non-circular bore mating with said second end of said tubular portion.

12. A bicycle pedal according to claim 11, wherein each of said first and second side portions has a first blind bore that rotatably receives one end of said first pivot pin.

13. A bicycle pedal according to claim 12, wherein each of said first and second side portions has a second blind bore that rotatably receives one end of said second pivot pin.

14. A bicycle pedal according to claim 1, wherein said bicycle pedal includes additional biasing members with different strengths adapted to be selectively mounted on said first pivot pin to vary a cleat clamping force applied to said first cleat engaging member.

15. A bicycle pedal according to claim 1, wherein said first pivot pin being rotatably mounted between said first and second side portion.

16. A bicycle pedal adapted to be attached to a cleat that is fixed to a bicycle shoe, comprising:

a pedal spindle having a center longitudinal axis of rotation;

a pedal body having a tubular portion rotatably coupled to said pedal spindle, a first side portion coupled to a first end of said tubular portion and a second side portion removably coupled to a second end of said tubular portion;

a first cleat engaging member pivotally coupled to said first and second side portions of said pedal body by a first pivot pin;

a second cleat engaging member coupled to said pedal body and cooperating with said first cleat engaging member to fixedly couple the cleat thereto;

a first biasing member having a first end portion engaging said pedal body, a mounting portion mounted on said first pivot pin and a second end portion engaging said first cleat engaging member; and a threaded bolt removably coupling said second side portion to said tubular portion, said threaded bolt passing through an opening in said second side portion and being threaded into a bore formed in said second end of said tubular portion.

17. A bicycle pedal according to claim 16, wherein each of said first and second side portions has a first blind bore that rotatably receives one end of said first pivot pin.

18. A bicycle pedal according to claim 17, wherein said second end of said tubular portion has a non-circular outer surface, and said second side portion has a non-circular bore mating with said second end of said tubular portion.

19. A bicycle pedal adapted to be attached to a cleat that is fixed to a bicycle shoe, comprising:

a pedal spindle having a center longitudinal axis of rotation;

a pedal body having a tubular portion rotatably coupled to said pedal spindle, a first side portion coupled to a first end of said tubular portion and a second side portion removably coupled to a second end of said tubular portion;

a first cleat engaging member pivotally coupled to said first and second side portions of said pedal body by a first pivot pin;

a second cleat engaging member coupled to said pedal body and cooperating with said first cleat engaging member to fixedly couple the cleat thereto; and a first biasing member having a first end portion engaging said pedal body, a mounting portion mounted on said first pivot pin and a second end portion engaging said first cleat engaging member, said second end of said tubular portion having a non-circular outer surface, and said second side portion having a non-circular bore mating with said second end of said tubular portion.

20. A bicycle pedal adapted to be attached to a cleat that is fixed to a bicycle shoe, comprising:

- a pedal spindle having a center longitudinal axis of rotation;
- a pedal body having a tubular portion rotatable coupled to said pedal spindle, a first side portion coupled to a first end of said tubular portion and a second side portion removably coupled to a second end of said tubular portion;
- a first cleat engaging member pivotally coupled to said first and second side portions of said pedal body by a first pivot pin;
- a second cleat engaging member coupled to said pedal body and cooperating with said first cleat engaging member to fixedly couple the cleat thereto; and
- a first biasing member having a first end portion engaging said pedal body, a mounting portion mounted on said first pivot pin and a second end portion engaging said first cleat engaging member,
- each of said first and second side portions includes a first blind bore that rotatably receives one end of said first pivot pin.

* * * * *